United States Patent [19]

Yamaguchi et al.

[11] 4,036,936
[45] July 19, 1977

[54] PROCESS FOR PREPARING HYDRAZINE HYDRATE

[75] Inventors: Hideo Yamaguchi; Hidetoshi Kume, both of Naruto; Osamu Shibuta, Tokushima, all of Japan

[73] Assignee: Otsuka Kagaku Yakuhin Kabushiki Kaisha, Osaka, Japan

[21] Appl. No.: 604,956

[22] Filed: Aug. 15, 1975

[51] Int. Cl.² .......................................... C01B 21/16
[52] U.S. Cl. ................................................ 423/407
[58] Field of Search ............................. 423/407, 408

[56] References Cited

U.S. PATENT DOCUMENTS

| 3,481,701 | 12/1969 | Otsuka et al. | 423/407 |
| 3,494,737 | 2/1970 | Mundil | 423/407 |
| 3,607,041 | 9/1971 | Ellis et al. | 423/407 |
| 3,869,541 | 3/1975 | Weiss et al. | 423/407 |

FOREIGN PATENT DOCUMENTS 626,885   9/1961   Canada

*Primary Examiner*—G. O. Peters
*Attorney, Agent, or Firm*—Toren, McGeady and Stanger

[57] ABSTRACT

Hydrazine hydrate is prepared by charging an aqueous or ketone solution of ketazine or hydrazone into a ketone recovering means, supplying the resultant solution to at least two hydrolysis reactors one after another, supplying the resultant hydrolyzed solution to an upper portion of a means for recovering hydrazine hydrate, and thereafter recovering hydrazine hydrate as an end product.

14 Claims, 3 Drawing Figures

PROCESS FOR PREPARING HYDRAZINE HYDRATE

This invention relates to a process for preparing hydrazine hydrate by hydrolyzing ketazine represented by the formula

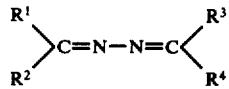
(I)

or hydrazone represented by the formula

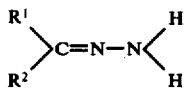
(II)

wherein $R^1$ and $R^2$ are the same or different and are each alkyl having 1 to 3 carbon atoms, the total number of carbon atoms of $R^1$ and $R^2$ being 4 or less than 4, $R^3$ and $R^4$ are the same or different and are each alkyl having 1 to 3 carbon atoms, the total number of carbon atoms pf $R^3$ and $R^4$ being 4 or less than 4.

The hydrolysis of ketazine and hydrazone is represented by the following Equations (A) and (B) or Equation (C), the combination of these two Equations.

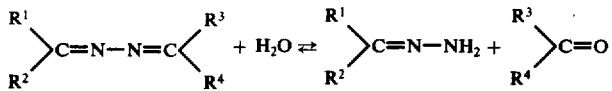
(A)

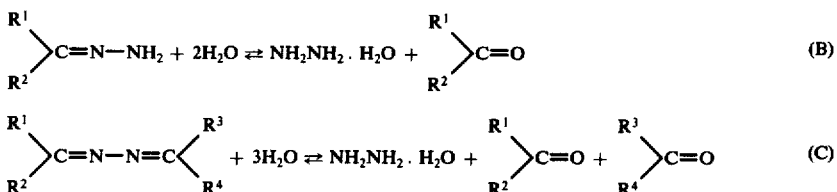
(B)

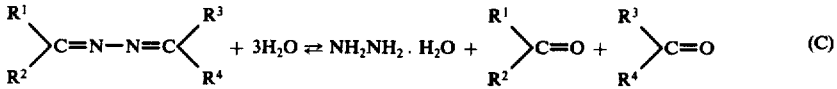
(C)

The hydrolysis of ketazine and hydrazone (hereinafter referred to simply as "ketazine" unless otherwise indicated) represented by the formulae (I) and (II) will be discussed in detail. First, ketazine undergoes partial hydrolysis in the presence of water, as shown in Equations (A), (B) and (C) to reach equilibrium (hereinafter referred to as "Equilibrium-1"). Since this hydrolysis reaction is a reversible reaction, the reaction system in which equilibrium is established conjointly contains ketazine, hydrazone, hydrazine hydrate, ketone (free ketone resulting from the reaction and ketone serving as a solvent when ketazine is used as dissolved in ketone) and water. Accordingly when the free ketone represented by

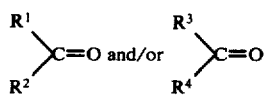

is subsequently withdrawn from the reaction system, the tendency for the system to attain equilibrium permits further hydrolysis of ketazine. Thus the reaction proceeds to the right to again establish equilibrium (hereinafter referred to as "Equilibrium-2"). When the mole ratio of ketone to hydrazine hydrate in the hydrolysis system is defined as $$K = \frac{\text{Total ketone}}{\text{Total hydrazine}} \quad (D)$$

wherein total ketone = [number of moles of free ketone in equilibrium system] + [number of moles of ketone to be formed by complete hydrolysis of ketazine or hydrazone]

total hydrazine = [number of moles of free hydrazine in equilibrium system] + [number of moles of hydrazine to be formed by complete hydrolysis of ketazine or hydrazone]

it is theoretically apparent that the reaction system can be rapidly brought to the states of Equilibrium-1 and Equilibrium-2 by reducing the mole ratio. Although the mole ratio appears reducible seemingly with extreme ease, the separation of free ketone from the system by fractional distillation, when actually attempted, allows large quantities of water, ketazine and hydrazine to be removed together with the ketone, because at Equilibrium-1 the mole fraction ratio of ketone produced is very low, whereas those of water, ketazine and hydrazone are high. Accordingly, one of great problems is how to effectively utilize the heat of vaporization of the water, ketazine and hydrazone to thereby achieve an improved hydrolysis efficiency.

Yamaguchi, Kume et al have already provided a process for preparing hydrazine hydrate by hydrolyzing ketazine using a column having a reflux condenser mounted thereabove and consisting of multiple stages in which ketazine charged in from an upper portion thereof is passed downward through the stages one after another while supplying steam to the column from below the stages (U.S. Pat. No. 3,481,701). The process, accomplished on an experimental scale, achieves a relatively good thermal efficiency, which however it is still desired to improve. The processes has the drawback that operation on an enlarged apparatus results in a greatly reduced hydrolysis efficiency, rendering the product costly.

Accordingly an object of this invention is to provide a process for preparing hydrazine hydrate from ketazine or hydrazone with a high thermal efficiency.

Another object of this invention is to provide a process for preparing hydrazine hydrate from ketazine or hydrazone on an industrial scale with a high hydrolysis efficiency.

Other objects and features of this invention will become apparent from the following description.

In preparing hydrazine hydrate by hydrolyzing ketazine or hydrazone represented by the formula

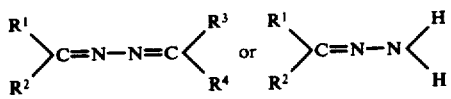

wherein $R^1$ and $R^2$ are the same or different and are each alkyl having 1 to 3 carbon atoms, the total number of carbon atoms of $R^1$ and $R^2$ being 4 or less than 4, $R^3$ and $R^4$ are the same or different and are each alkyl having 1 to 3 carbon atoms, the total number of carbon atoms of $R^3$ and $R^4$ being 4 or less than 4, this invention provides a process comprising the steps of:

1. charging a starting material in the form of an aqueous or ketone solution into a means for recovering ketone to remove free ketone by fractional distillation with heating, supplying the resulting solution to at least two hydrolysis reactors one after another to hydrolyze the solution, each of the reactors having a contact column on the top of the reactor, supplying the resulting solution to an upper portion of a means for recovering hydrazine hydrate having heating means, and thereafter recovering hydrazine hydrate as an end product, 2. charging vapor produced in the hydrazine hydrate recovering means to a lower portion of a contact column of a hydrolysis reactor preceding the hydrazine hydrate recovering means to bring the vapor into countercurrent contact with a portion of reaction solution flushed into an upper portion of the contact column from the preceding reactor, and charging a vapor from the preceding reactor to another hydrolysis reactor preceding the preceding reactor to similarly bring the vapor into countercurrent contact with a portion of reaction solution withdrawn from the second-mentioned preceding reactor, 3. supplying a vapor from the hydrolysis reactor most proximate to the ketone recovering means to the ketone recovering means to recover ketone formed by the hydrolysis of reaction solution from the vapor along with free ketone from the starting material, and 4. causing a solution to remain in each of the hydrolysis reactors in an amount not smaller than the amount of aqueous solution of hydrazine hydrate recovered from the hydrazine hydrate recovering means per hour, the solution remaining in the hydrolysis reactors having a mole ratio of 2.0 to 1.2 which mole ratio is defined by K of the following equation:

$$K = \frac{\text{Total ketone}}{\text{Total hydrazine}}$$

wherein $$\text{total ketone} = \begin{bmatrix}\text{number of} \\ \text{moles of free} \\ \text{ketone in} \\ \text{equilibrium} \\ \text{system}\end{bmatrix} + \begin{bmatrix}\text{number of moles of} \\ \text{ketone to be formed} \\ \text{by complete hydrolysis} \\ \text{of ketazine or} \\ \text{hydrazone}\end{bmatrix}$$

$$\text{total hydrazine} = \begin{bmatrix}\text{number of} \\ \text{moles of free} \\ \text{hydrazine in} \\ \text{equilibrium} \\ \text{system}\end{bmatrix} + \begin{bmatrix}\text{number of moles of} \\ \text{hydrazine to be} \\ \text{formed by complete} \\ \text{hydrolysis of} \\ \text{ketazine or hydrazone}\end{bmatrix}$$

Our researches have revealed that the behavior of reaction solution having the above-defined K value in the range of 2.0 to 1.2 materially influences the efficiency of hydrolysis in the production of hydrazine hydrate from ketazine. First, because the reaction solution having a K value of 2.0 to 1.2 reaches Equilibrium-1 at a low velocity, the hydrolysis efficiency can be remarkably improved by causing the reaction solution having such K value to remain in the hydrolysis reactor in an amount larger than the amount of final reaction product to be withdrawn from the hydrazine hydrate recovering means per hour. Second, the reduction in the linear velocity of evaporation of the reaction solution having a K value of 2.0 to 1.2 has been found to increase the hydrolysis efficiency of the reaction solution. With the present invention, therefore, part of the reaction solution drawn off from a lower portion of the hydrolysis reactor is flushed into an upper portion of a contact column on the top of the reactor.

With reference to the drawings, this invention will be described below.

Suitable amounts of acetone are added to a 10 W/V % aqueous solution of hydrazine to prepare solutions whose mole ratios, i.e. K values, are 0.5, 1.0, 1.5, 2.0 and 2.25 respectively. As will be apparent from Equations (A) and (B), the following equilibrium is established in these solutions.

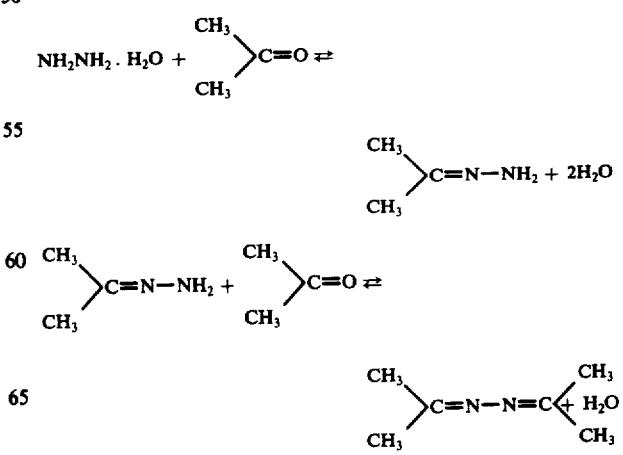

Subsequently a 200-ml portion and a 500-ml portion of the solution having the above-specified mole ratio are placed respectively into 200-ml and 500-ml distilling flasks having the same evaporation surface area. Each of the solutions is heated for 10 minutes to obtain 10 ml of fraction. The mole ratio K of the fraction is determined. The results are shown in FIG. 1.

Figure 1:
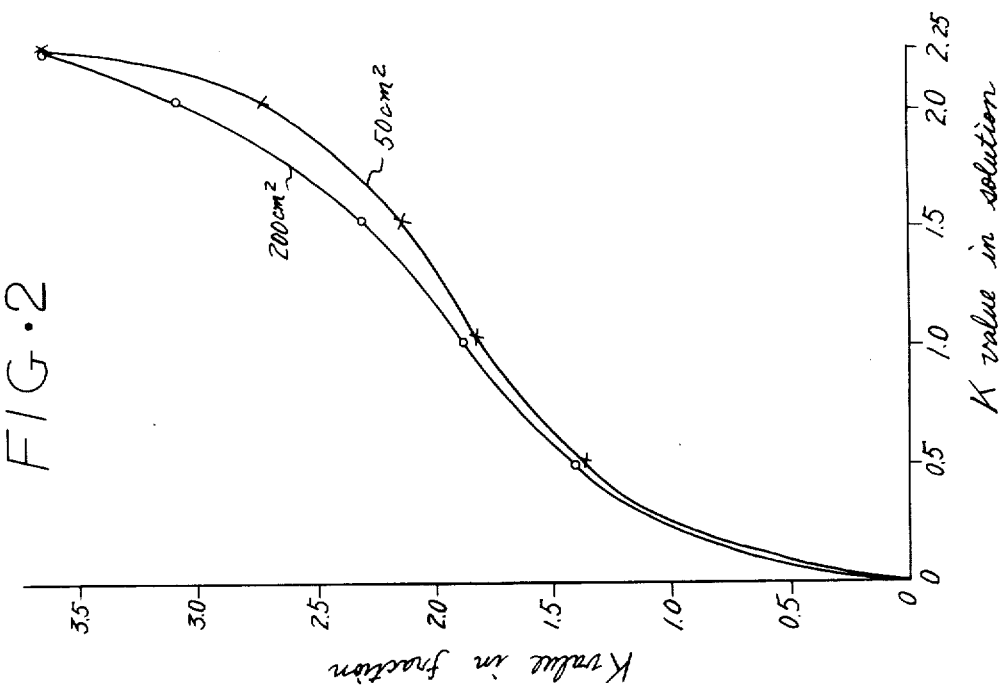
FIG. 1 is a graph showing the influence of the amount of reaction solution retained in the hydrolysis reactor on the efficiency of hydrolysis.

FIG. 1 indicates that the composition of the fraction, in other words the composition of the residue, depends largely on the amount of the solution. More specifically with original solutions ranging from 1.2 to 2.0 in the value K, the mole ratio of the fraction rises or the mole ratio of the residue lowers with the increase in the amount of the solution. This evidences that the increase in the amount of the solution greatly promotes the hydrolysis reaction. Thus higher hydrolysis efficiencies are advantageously attainable when the reaction solution having a K value of 2.0 to 1.2 is made to remain in the system in a larger quantity than a reaction solution whose K value is below 1.2. With the present invention, therefore, the amount of reaction solution having a K value of 2.0 to 1.2 and retained in each hydrolysis reactor is at least not smaller than the amount of hydrazine hydrate solution resulting from hydrolysis per hour. More preferably, the former is about 2 to 10 times the latter in view of the overall scale of the apparatus, yield, etc.

Figure 2:
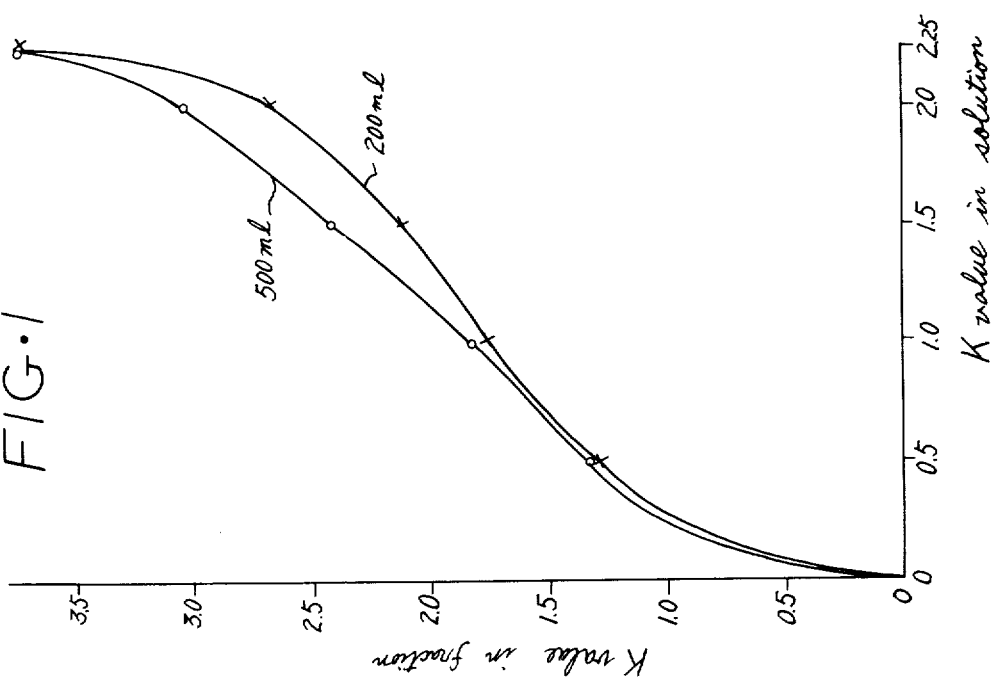
FIG. 2 is a graph showing the influence of linear velocity of evaporation of the reaction solution in the hydrolysis reactor on hydrolysis.

The same procedure as above is followed to prepare solutions whose mole ratios, i.e. K values, are 0.5, 1.0, 1.5, 2.0 and 2.25. Two 350-ml portions of the solution are placed respectively into distilling flasks having different evaporation surface areas, namely 200 cm$^2$ and 50 cm$^2$. Each of the solutions is heated for 10 minutes to obtain 10 ml of fraction. The mole ratio K of the fraction is determined. FIG. 2 shows the results, which reveal that under constant heating conditions, namely with a constant amount of evaporation, the evaporation surface area profoundly influences the composition of the fraction, in order words the composition of the residue, where the K value is in the range of 2.0 to 1.2. More specifically stated, with reaction solutions ranging from 1.2 to 2.0 in mole ratio K, the mole ratio of the fraction remarkably increases or the mole ratio of the residue lowers with the increase in the evaporation surface area, namely with the decrease in the linear velocity of evaporation which is given by: (Amount of evaporation/Evaporation surface area). Manifestly an increased evaporation surface area or reduced linear velocity of evaporation leads to a higher hydrolysis efficiency. According to the present invention, therefore, part of the reaction solution drawn off from the hydrolysis reactor is circulated thereto in the form of a flush into the vapor phase in the upper portion of the reactor to form a three-dimensional evaporation surface for the purpose of remarkably enlarging the evaporation surface area or of greatly reducing the linear evaporation velocity. In view of the amount of reaction solution retained in the reactor and other conditions, the linear velocity of evaporation according to this invention is usually not higher than 10 cm/sec., preferably 0.1 to 0.6 cm/sec.

Figure 3:
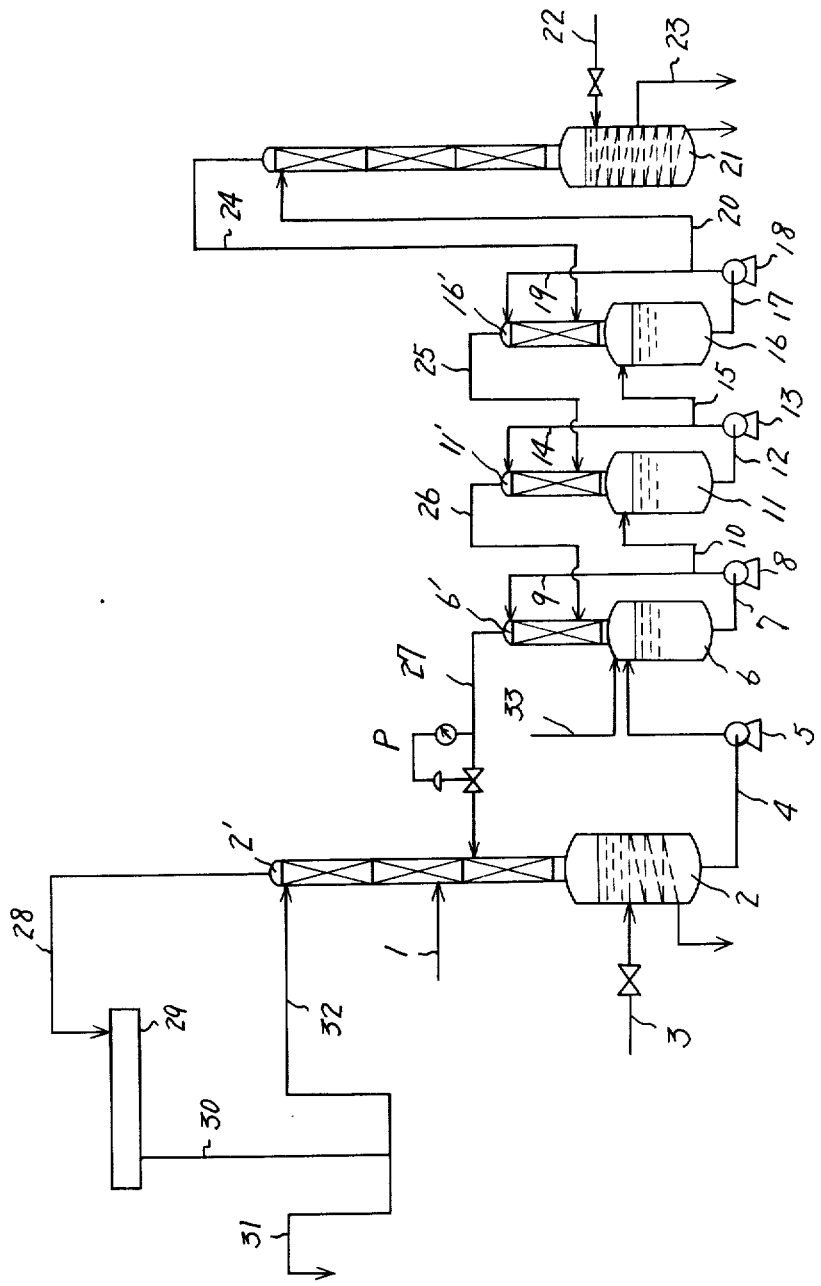
FIG. 3 is a flow chart showing a mode of practicing this invention.

This invention will be described below in greater detail with reference to the flow chart of FIG. 3 showing the process of this invention for illustrative purpose only. Ketazine or hydrazone, starting material, is fed to a ketone recovering means 2 through a line 1. The starting material is charged usually in the form of an aqueous solution having a mole ratio K of 2 or less, or of a ketone solution having a mole ratio K of greater than 2 as dissolved in acetone, methyl ethyl ketone, etc. The ketone recovering means 2 is provided, on its top, with a ketone-fractionating column 2' of the packed column type and has a heating means 3 utilizing steam. When desired, the starting material is heated in the ketone recovering means 2 by the steam heating means 3, and the ketone fractionated from the starting material is led from the ketone-fractionating column 2' through a line 28 to a condenser 29, from which is is recovered by way of lines 30 and 31. Preferably the ketone is recovered from the starting material in the ketone recovering means to the greatest possible extent to lower the mole ratio K of the material as much as possible. The starting material is drawn off from a lower portion of the ketone recovering means 2 via a line 4 and sent to a first hydrolysis reactor 6 by a pump 5. When the starting material is a ketone solution of ketazine, water is supplied to the reactor 6 through a line 33. A portion of the reaction solution in the reactor 6 is drawn off from its bottom via a line 7, forced by a pump 8 through a line 9 and flushed into a contact column 6' on the top of the reactor 6, whereupon the solution comes into contact with vapor from a contact column 11' on the top of a second hydrolysis reactor 11 to be described later. Consequently free ketone in the solution which has been in equilibrium within the reactor 6 is transferred into the vapor. This materially increases the ketone concentration of vapor from the contact column 6'. The ketone-containing vapor is therefore led to the ketone-fractionating column 2', from which the ketone is recovered along with the free ketone from the starting material. The water, ketazine and hydrazine in the vapor within the contact column 6' are circulated downward into the reactor 6, in which the heat of the vapor is effectively utilized. The reaction mixture having a reduced K value is forced by the pump 8 through lines 7 and 10 to the second hydrolysis reactor 11, in which it is similarly subjected to hydrolysis. The resultant solution from the second reactor 11 is sent by a pump 13 through lines 12 and 15 to a third hydrolysis reactor 16. In this way, the mole ratio K of the solution is progressively lowered. The reaction mixture obtained from the third reactor 16, although still containing ketazine, has a high hydrazine concentration. It is in the form of an aqueous solution of hydrazine hydrate having a mole ratio for example of about 1.2. The aqueous solution is sent by a pump 18 through lines 17 and 20 to the top of a hydrazine hydrate recovery column 21. The column 21 is equipped with suitable heating means such as steam heating means. The vapor given off from the reaction mixture within the recovery column 21 comes into countercurrent contact with the reaction solution charged into the upper portion thereof via the line 20. The ketone and ketazine fractionated from the solution, and vapor are led through a line 24 into the contact column on the third reactor 16. Similarly the vapor from the contact column 16' is forwarded through a line 25 to the contact column 11' on the second reactor 11. The vapor from the contact column 11' is conducted through a line 26 to the contact column 6' on the first reactor 6. The vapor from the contact column 6' is sent through a line 27 to the ketone-fractionating column 2' on the ketone recovering means 2. Thus the vapor is effectively utilized as a heat source for the reactors and ketone recovering means. On the other hand, an aqueous solution of hydrazine hydrate is continuously recovered from the recovery column 21 via a line 23. A portion of the ketone recovered from the fractionating column 2' by way of the line 28, condenser 29 and line 30 can be refluxed through a line 32 to the fractionating column 2', in which the ketone may be contacted with the vapor from the ketone recovering means 2 and from the contact column 6' for the recovery of ketazine, hydrazine hydrate and water contained in the vapor.

Because the reaction mixture can be hydrolyzed with greatly improved efficiency when it has a mole ratio K of 2.0 to 1.2 as already described, it is essential that a reaction mixture having a K value within this range be retained in the reactors 6, 11 and 16 and that the amount of the mixture retained in each of the reactors be not smaller than the amount of aqueous hydrate recovered per hour.

It will be apparent from the foregoing description that with this invention the thermal energy supplied to the hydrazine hydrate is effectively utilized in the reactors and ketone recovering means in succession, so that the ketone recovering means may be heated to such extent that ketone will be fractionated and ketazine or hydrazone and water are recoverable from the vapor from the contact column 6'.

While the flow chart of FIG. 3 shows three hydrolysis reactors, the number of the reactors is determined in accordance with the scale of the overall hydrolysis system (i.e. the desired yield of hydrazine hydrate), the size of the reactor, the temperature and pressure of hydrolysis reaction, etc. At least two, preferably 2 to 4 reactors are used. The process of this invention may be practiced at atmospheric or elevated pressure. Particularly when the reaction is conducted at an increased pressure, the number of hydrolysis reactors and steam requirement are reducible. Under excessively high pressure, however, hydrazine tends to decompose; the pressure is limited to about 4 kg/cm² gauge if highest, therefore.

The temperature of the reaction mixture in the hydrolysis system is also widely variable with the kind of the starting material, K value, reaction pressure, etc. The temperature of the solution in the ketone recovering means is usually about 56.5 to 102° C, preferably about 85° to 98° C under atmospheric pressure and up to about 150° C under elevated pressure. The temperature of the solution in the hydrazine hydrate recovery column is usually about 96 to 115° C, preferably about 102° to 106° C under atmospheric pressure and up to about 160° C under elevated pressure. The hydrolysis in the reactors is conducted at temperatures intermediate of the above-mentioned temperatures and raised progressively from reactor to reactor.

The process of this invention will be described below more specifically with reference to Examples, to which the invention is not limited.

EXAMPLE 1

To the apparatus shown in FIG. 3 is fed a 15 W/V % aqueous solution of acetone azine at a rate of 90 liter/hr. to continuously produce a 8.08 W/V % aqueous solution of hydrazine hydrate containing 0.5 W/V % of acetone at a rate of 73.4 liter/hr. The acetone is recovered at a rate of 13.6 kg/hr. In each of the hydrolysis reactors 6, 11 and 16, 150 liter of the reaction mixture is retained, whilst the reaction mixture is flushed into each of the contact columns 6', 11' and 16' at a rate of 2,500 liter/hr. The reaction system is maintained at temperatures of 87° C, 95° C, 97° C, 99° C and 105° C in the ketone recovering means 2, reactors 6, 11 and 16, and hydrazine hydrate recovery column 21 respectively.

Based on the theoretical values, 99.7% of hydrazine hydrate and 99.8% of acetone are recovered. Steam consumption is 6.0 kg per kilogram of hydrazine hydrate.

EXAMPLE 2

To the apparatus shown in FIG. 3 is fed a 30 W/V % aqueous solution of acetone azine at a rate of 50 liter/hr. to continuously produce a 20.1 W/V % of aqueous solution of hydrazine hydrate containing 0.85 W/V % of acetone, while recovering the acetone at a rate of 15.3 kg/hr. A 150 liter quantity of the reaction solution is retained in each of the hydrolysis reactors 6, 11 and 16, whilst the reaction solution is flushed into each of the contact columns 6', 11' and 16' at a rate of 2,500 liter/hr. The reaction system is maintained at temperatures of 88° C, 96° C, 98° C, 99° C and 106° C in the ketone recovering means 2, reactors 6, 11 and 16, and hydrazine hydrate recovery column 21 respectively.

Based on the theoretical values, 99.7% of hydrazine hydrate and 99.8% of acetone are recovered. Steam consumption is 7.2 kg per kilogram of hydrazine hydrate.

EXAMPLE 3

In an apparatus similar to that shown in FIG. 3 except that it is provided with only two hydrolysis reactors 6 and 11, a pressure control valve P is mounted on the line 27 extending from the contact column 6' to the ketone-fractionating column 2' to maintain the system from the contact column 6' to the hydrazine hydrate recovery column 21 at pressure of 3.5 kg/cm² gauge. In this state, a 15 W/V % methyl ethyl ketone solution of methyl ethyl ketone azine is fed to the hydrolysis system at a rate of 107 liter/hr. Similarly water is supplied at a rate of 51.4 liter/hr. A 12.5 W/V % aqueous solution of hydrazine hydrate is continuously produced at a rate of 45.6 liter/hr. while the methyl ethyl ketone is being recovered at a rate of 91 kg/hr. A 150 liter quantity of the solution is retained in each of the hydrolysis reactors 6 and 11, whilst the solution is flushed into each of the contact columns 6' and 11' at a rate of 3,000 liter/hr. The system is maintained at temperatures of 96° C, 140° C, 142° C and 151° C in the ketone recovering means 2, reactors 6 and 11, and hydrazine hydrate recovery column 21 respectively.

Based on the theoretical values, 99.4% of hydrazine hydrate and 99.6% of methyl ethyl ketone are recovered. Steam consumption is 7.5 kg per kilogram of hydrazine hydrate.

What we claim is:

1. In preparing hydrazine hydrate by hydrolyzing ketazine or hydrazone represented by the formula

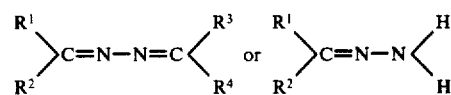

wherein
$R^1$ and $R^2$ are the same or different and are each alkyl having 1 to 3 carbon atoms, the total number of carbon atoms of $R^1$ and $R^2$ being 4 or less than 4, $R^3$ and $R^4$ are the same or different and are each alkyl having 1 to 3 carbon atoms, the total number of carbon atoms of $R^3$ and $R^4$ being 4 or less than 4, a process comprising the steps of:

1. removing free ketone from ketazine or hydrazone in the form of an aqueous or ketone solution by fractional distillation;
2. hydrolyzing the solution resulting from the fractional distillation by treating said solution in at least two hydrolysis reactors in series, each of the hydrolysis reactors having contact columns at the top thereof;
3. supplying the solution resulting from the hydrolysis treatment in step (2) to the upper portion of a hydrazine hydrate recovery means and recovering hydrazine hydrate from the bottom of the hydrazine hydrate recovery means and obtaining a vapor from the top of said hydrazine hydrate recovery means;
4. contacting the recovered vapor from step (3) in countercurrent manner with the solution contained in the last in the series of hydrolysis reactors and sequentially contacting the thus contacted vapor with the solutions in each of the next preceding hydrolysis reactors;
5. finally removing the vapor from the first of the hydrolysis reactors and introducing the vapor to the fractional distillation step to remove ketones from said vapor;

and wherein during the process, the amount of solution in each of the hydrolysis reactors is not less than the amount of aqueous solution of hydrazine hydrate recovered per hour from step (3) and wherein the solution in each of the hydrolysis reactors has a mole ratio between 2.0 to 1.2, said mole ratio being defined by the following formula:

$$\text{mole ratio} = \frac{\text{total ketone}}{\text{total hydrazine}}$$

$$\text{total ketone} = \begin{bmatrix} \text{number of} \\ \text{moles of free} \\ \text{ketone in} \\ \text{equilibrium} \\ \text{system} \end{bmatrix} + \begin{bmatrix} \text{number of moles} \\ \text{of ketone to} \\ \text{be formed by} \\ \text{complete hydrolysis} \\ \text{of ketazine} \\ \text{or hydrazone} \end{bmatrix},$$

$$\text{total hydrazine} = \begin{bmatrix} \text{number of} \\ \text{moles of free} \\ \text{hydrazine in} \\ \text{equilibrium} \\ \text{system} \end{bmatrix} + \begin{bmatrix} \text{number of} \\ \text{moles of} \\ \text{hydrazine} \\ \text{to be formed} \\ \text{by complete} \\ \text{hydrolysis} \\ \text{of ketazine} \\ \text{or hydrazone} \end{bmatrix}.$$

2. The process according to claim 1 in which said amount of the solution remaining in each of the hydrolysis reactors is about 2 to 10 times the amount of aqueous solution of hydrazine hydrate recovered per hour.

3. The process according to claim 1 in which the amount of reaction solution to be flushed into the contact column from the reactor is such that the linear velocity of evaporation of reaction solution is not higher than 10 cm/sec.

4. The process according to claim 3 in which said linear velocity of evaporation is in the range of 0.1 to 0.6 cm/sec.

5. The process according to claim 1 in which the number of said hydrolysis reactors is 2 to 4.

6. The process according to claim 1 in which the pressure in the system is atmospheric pressure.

7. The process according to claim 1 in which the temperature of the solution in ketone recovering means is in the range of about 56.5° to 102° C.

8. The process according to claim 7 in which said temperature is in the range of 85° to 98° C.

9. The process according to claim 1 in which the pressure in the system is an elevated pressure of up to 4 kg/cm$^2$.

10. The process according to claim 1 in which the temperature of the solution in ketone recovering means is up to about 150° C.

11. The process according to claim 1 in which the temperature of the solution in the hydrazine hydrate recovery column is in the range of about 96° to 115° C.

12. The process according to claim 11 in which said temperature is in the range of about 102° to 106° C.

13. The process according to claim 1 in which the temperature of the solution in the hydrazine hydrate recovery column is up to about 160° C.

14. The process according to claim 1 in which the hydrolysis in the reactors is conducted at temperatures intermediate of those of solutions in the ketone recovery step and hydrazine hydrate recovery means, and is raised progressively from reactor to reactor.

* * * * *